United States Patent Office 3,354,094
Patented Nov. 21, 1967

3,354,094
COMPOSITION AND METHOD FOR
TREATING SCALE
Karl C. ten Brink and Jack F. Tate, Houston, Tex., assignors to Texaco Inc., New York, N.Y., a corporation of Delaware
No Drawing. Filed July 8, 1964, Ser. No. 381,232
12 Claims. (Cl. 252—180)

ABSTRACT OF THE DISCLOSURE

A scale inhibiting composition and method of using same to control the build-up of scale deposits in aqueous systems comprising an aqueous composition of an inorganic alkaline reagent and a non-catalytic heat modified starch material, the alkaline reagent being present in an amount sufficient to provide a pH of at least 7.1 to the aqueous mixture and to dissolve said starch; the starch component is prepared by the method consisting of (a) non-catalytic dry roasting of starch at 300–400° F. for at least 36 hours, or (b) the non-catalytic dry roasting of a hypochlorite oxidized starch at 300–400° F. for 15 minutes to 6 hours. The aqueous composition is used in an amount sufficient to inhibit the development of scale in the aqueous system.

---

This invention relates to a composition useful in treating oil and gas wells and to a method of using such composition for such treatment. More particularly, this invention is directed to a composition and method useful in the prevention and/or inhibition of the build-up of undesirable scale deposits in oil and gas wells, their flow lines, auxiliary producing equipment, such as heat exchangers and cooling towers, as well as the producing strata in the vicinity of the well bore. Additionally, the invention is useful in the prevention and/or inhibition of build-up of scale deposits in aqueous systems susceptible to scale formation.

The formation of objectionable scale deposits, such as calcium or barium sulfate is rather wide spread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams at the well bore results in the precipitation of a hard crystalline calcium sulfate deposit which gradually builds up on the walls of the well tubing, for example, to a point where it would choke off fluid flow in the tube if remedial measures were not undertaken.

Another cause of scale formation is attributed to the precipitation of scale material from supersaturated salt solutions containing the same. When such solutions pass from strata wherein temperatures and pressures are relatively high into the relatively low temperature and pressure area at or about the well bore, precipitation of the salt on the tubing and surrounding strata occurs.

The use of strong alkali solutions for the removal of sulfate scale has been proposed. It has been claimed that under certain favorable conditions of temperature and time, concentrated alkali solutions will, in some cases, provide a break-up of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This deposit of precipitate may then be removed by suitable mechanical means. Such a method is obviously undesirable in that considerable periods of time are involved and the use of mechanical apparatus is expensive, and in some cases, either undesirable or mechanically impossible. Moreover, strong alkali is not effective in preventing or inhibiting the build-up of scale deposits in well tubing, production equipment and the producing strata about the bore hole.

It is, accordingly, an object of this invention to provide a method of inhibiting and/or preventing the build-up of scale deposits in gas and oil flow lines, auxiliary equipment, well tubing and the surrounding subsurface strata.

A further object is to provide a scale treating composition for use in preventing the build-up of scale deposits in the well tubing, producing equipment, the bore hole and surrounding strata.

A still further object of this invention is to provide a method of and composition for the treatment of gas and oil well tubing and the like containing sulfate scale therein to prevent and/or inhibit the build-up of further scale deposits in the tubing.

These as well as other objects are accomplished according to the present invention which comprises a scale prevention and/or inhibition composition comprising an aqueous alkaline solution of a non-catalytic heat modified starch material, as hereinafter more fully defined, and an inorganic alkaline reagent which is present in an amount sufficient to dissolve the starch material in the solution and to provide a pH in the range of at least 7.1, preferably 7.5 to 10 to the aqueous alkaline solution.

The invention also comprises a method of treating equipment susceptible to the development of scale deposits therein such as water storage tanks and the like, particularly oil field equipment, using the scale prevention composition.

The non-catalytic heat modified starch material employed in the composition and method of the present invention is a non-catalytically dry-heated starch material prepared by the method disclosed in the copending application of Walker and Weiss, Ser. No. 97,151, filed Mar. 21, 1961, now abandoned, or the non-catalytically dry-heated starch material prepared by the method disclosed in the copending application of Walker, Ser. No. 119,804, filed June 27, 1961, now abandoned, the disclosures of these applications being incorporated in and made part of this application.

According to the disclosure of the Walker and Weiss application Ser. No. 97,151, the heat modified starch material is prepared by the non-catalytic dry roasting of starch at a temperature between 300 and 400° F. for 36 hours or more and preferably at about 350° F. for 168 hours. According to the Walker application Ser. No. 119-804 the heat modified starch material is prepared by the non-catalytic dry roasting of a hypochlorite oxidized starch at a temperature within the range of from about 300° F. to a temperature less than the temperature at which combustion occurs for a period of time from about 15 minutes to 6 hours, preferably at a temperature between 350 and 400° F. and a time period of from 1 to 3 hours.

The heat modified starch materials of the above identified patent applications are used as dispersant agents for clayey solids in aqueous drilling fluids. As drilling fluid dispersants these materials are used in the range of from about 0.5 pound per barrel to about 3–7 pounds per barrel, which for a 10 pound per gallon drilling fluid is from about 0.12 to about .7–1.7 percent by weight.

The inorganic alkaline reagent is present in the aqueous scale prevention composition in an amount sufficient to provide an alkaline pH thereto. A satisfactory pH range is from 7.1 to about 10. A pH range below 7.1 e.g. 7.0 or less, has been found to be ineffective since the non-catalytic heat modified starch is insoluble while a pH range above about 10 does not provide any additional advantage.

Specific inorganic alkaline reagents suitable for use in the treating composition include sodium hydroxide, potassium hydroxide and calcium hydroxide.

In general, the composition of the present invention may broadly contain from about 33 to about 95 percent by weight of the non-catalytic heat modified starch material and from about 5 to about 67 percent of the inorganic alkaline reagent. Based on the neutralization number of the particular starch material and the specific alkalinity agent, suitable compositions of minimum alkaline reagent may contain the non-catalytic heat modified starch material in an amount of from about 70 to 95% by weight, balance 5 to 30%, being the inorganic alkaline reagent.

For example, for a heat modified starch material prepared by the method disclosed in copending application Ser. No. 97,151 (300–400° F. and heating for 36 hours or more), having an average neutralization number of 245, the following percentage compositions are satisfactory to provide minimum alkaline levels:

(1) 70–75% of the starch material—25–30% slaked lime
(2) 80–85% of the starch material—15–20% caustic soda.

For the heat modified starch material prepared by the method disclosed in copending application Ser. No. 119,804 (300° F. or more for 15 minutes to 6 hours), having an average neutralization number of 73, the following percentage compositions are satisfactory for minimum alkaline levels:

(a) 88–91% of the starch material—9–12% slaked lime
(b) 90–95% of the starch material—5–10% caustic soda.

The preferred compositions are (2) and (b) above. The compositions can be readily prepared in a known manner, the order of addition not being critical. These percentage values are based on the above indicated neutralization numbers for the heat modified starch materials. When the neutralization numbers are different the amounts of the starch material and the alkalinity reagent also vary from the above values as is readily apparent to those skilled in the art.

In carrying out one aspect of the present invention the method thereof comprises introducing the scale prevention composition into the equipment to be protected, such as oil well tubing, in the form of an aqueous solution in an amount sufficient to provide the heat modified starch material therein at a concentration of 0.002 to 0.05% by weight and a pH between 7.1 and 10 and maintaining the scale treating composition in contact with the internal surfaces thereof therein for a contact time sufficient to prevent and/or inhibit the development of scale deposits or additional scale deposits therein. It is desirable to circulate the scale prevention composition through the system to provide adequate contact of the composition with the surfaces to be protected. Underground strata surrounding the well bore can be treated in a like manner, i.e., by passing the solution into said strata such as by injection of the solution down through the bore hole or production tubing, preferably under pressure.

In general, it has been found that excellent protection against objectionable scale deposits can be obtained by maintaining the treating composition in contact with the scale for a contacting time period of from about 2 to about 24 hours, and preferably between about 4 to 12 hours. This contacting time period can also be advantageously used in areas containing some scale deposits such as oil field tubing to prevent or inhibit the build-up of additional scale deposits therein. In areas where heavy scale deposits are present or are likely to be encountered, the contacting time period can be extended to 24 hours or more without any harmful effects. If treatment is carried out at fairly frequent intervals with the composition of the present invention i.e. on a semiweekly or weekly basis, then shorter contacting times (e.g. averaging about 4 to 10–12 hours) can be used. Less frequent treating intervals, i.e. at about 10 or 15 days generally necessitate corresponding longer contacting times that may average between 12 to 24 hours.

The scale prevention composition of the present invention is used in an amount sufficient to provide to the treating solution the non-catalytic heat modified starch material in an amount of from 0.002% to 0.05% by weight and for such solution to have a pH in the range of at least about 7.1. It has been found that excellent results are obtained in the heat modified starch material at concentrations in the range of from about 0.002% to about 0.01% by weight, (20 to 100 p.p.m.). In areas containing appreciable amounts of scale deposits, the build-up of additional scale deposits therein is also inhibited or prevented by use of the heat modified starch material at a concentration of about 0.01% to 0.05%.

Amounts of heat modified starch material below 0.002% are ineffective because at such low concentrations scale inhibition is not attained. Higher concentrations (above 0.05%) do not provide improved scale protection.

It is necessary that the heat modified starch be employed in an alkaline aqueous medium to prevent and/or inhibit the build-up of scale deposits in the equipment or bore hole.

In the absence of an alkaline aqueous medium the heat modified starches are not effective scale inhibitors. Further, an alkaline aqueous system alone is also ineffective in preventing the build-up of scale deposits in the system. This necessary requirement can be readily met at a producing well site by using the produced formation water which is generally alkaline, or the formation water can be readily treated with an alkaline material to obtain the required alkaline pH range thereto. For example, a neutral or slightly acidic formation water can be made alkaline by the addition thereto of a minor amount of an inorganic alkaline reagent thereto, such as sodium or potassium hydroxide, calcium hydroxide or other compatible inorganic alkaline reagent thereto.

The treating composition can be prepared as an additive admixture of the starch material and the alkalinity reagent with the admixture being incorporated in the aqueous system to provide protection. One may also add the components (heat modified starch material and inorganic alkalinity reagent) separately to the aqueous system.

It has been found that the degree of scale prevention protection provided by the heat modified starch material and alkaline reagent can be enhanced by employing the composition in an aqueous solution that is maintained at a temperature between about 100° F. and 200° F., preferably between 105° and 175° F. Such temperatures can be readily attained by the use of auxiliary heaters and the like as will be readily apparent to those skilled in the art. In treating oil well tubing and the strata surrounding a bore hole that is at an elevated temperature, one may raise the temperature of the scale prevention composition to the desired elevated temperature by briefly holding the solution in the bore hole until the selected operating temperature is attained.

A more complete understanding of the invention will be obtained from the following illustrative examples.

Example 1

Argo brand corn starch was non-catalytically heated in the dry state at a temperature of 350° F. for about 168 hours and cooled to room temperature. The resulting starch product had a neutralization number of about 245.

Example 2

A peroxidized corn starch sold under the tradename Stayco A, was non-catalytically heated in the dry state for three hours at 390–394° F. and cooled to room temperature.

The heat modified starch materials of Examples 1 and 2 above were tested to determine their effectiveness in preventing and/or decreasing the build-up of scale deposits. Additional tests were conducted with commercial descaling and inhibitor compositions to evaluate the effectiveness of the compositions of the invention.

The following procedure was used in the evaluations.

A 1000 milliliter glass beaker was provided with sufficient calcium sulfate and sodium chloride, obtained by mixing solutions of calcium chloride and sodium sulfate, to produce an aqueous concentration thereof of 10,000 parts per million of calcium sulfate and 50,000 parts per million of sodium chloride. A preweighed metal rotor attached to an externally provided mechanical stirring device was immersed in the test solution for a twenty-four hour time period. The solution was maintained at a temperature of 104° F. during the test period. At the end of the 24 hours, the rotor was removed from the solution and from the stirrer, dried and reweighed. The difference in weight of the rotor is taken as the amount of calcium sulfate scale deposit build-up expressed in grams of scale. The above laboratory test procedure affords good correlation between the results thereby obtained and larger scale pilot evaluations of commercial scale preventing compositions.

The following table records the results of the tests.

TABLE.—AVERAGE WEIGHT OF CALCIUM SULFATE SCALE DEVELOPED (GRAMS) AFTER 24 HOURS AT 104° F.

| Ex. | Additive | Amount of Additive (p.p.m.) | | | | |
|---|---|---|---|---|---|---|
| | | 0 | 20 | 25 | 50 | 100 |
| Control | | 1.538 | | | | |
| Control | 2.5 Me NaOH | 1.20 | | | | |
| 1 | Starch of Ex. 1 plus 2.5 Me NaOH | | 0.080 | 0 | 0.011 | 0.014 |
| 2 | Starch of Ex. 2 plus 2.5 Me NaOH | | 0.039 | | 0.036 | 0.012 |
| 3 | TSPP [1] | | | | 0.079 | |
| 4 | $NaH_2PO_2 \cdot H_2O$ | | | | 1.470 | |
| 5 | Composition W | | | | 1.548 | |
| 6 | Composition X | | 1.655 | | | |
| 7 | Composition Y | | | | 1.201 | |
| 8 | Composition Z | | | | [2] 0.951 | |

[1] TSPP—Sodium Pyrophosphate.
[2] After 18 hours

Inspection of the test results on the various compositions of Examples 1–8 in the above table shows that only the compositions of the present invention, namely Examples 1 and 2, are effective in reducing the build-up of scale deposits. The data for these examples show that increasing the concentration of the composition results in decreased amount of scale build-up during the test period. The table further shows that other materials, particularly the four commercial scale preventing compositions, designated as compositions W, X, Y and Z (Examples 5–8), were not as effective or were completely ineffective in reducing the build-up of the scale under similar test conditions and periods.

It is surprising that the composition of the present invention is effective in the prevention and/or inhibition of the build-up of scale deposits in aqueous systems when other materials, particularly starch materials such as "Argo" brand of corn starch or a drilling fluid starch water loss additive such as "Impermix" do not prevent or inhibit the build-up of scale deposits.

Obviously, many modifications and variations of the invention as hereinbefore set forth may be made without departing from the spirit and scope thereof and therefore only such limitations should be imposed as are indicated in the appended claims.

We claim:

1. A method of controlling the build-up of calcium sulfate scale deposits in an aqueous system which comprises incorporating in said system an aqueous scale treating composition consisting essentially of a non-catalytic heat modified starch material and an inorganic alkaline reagent, said alkaline reagent consisting of a hydroxide of sodium, potassium or calcium and being present in said composition in an amount sufficient to dissolve said starch material and to provide a pH of at least 7.1 to said aqueous composition, said treating composition being used in an amount sufficient to inhibit the development of scale in said system, said non-catalytic heat modified starch material being prepared by the method consisting of (a) the non-catalytic dry roasting of starch at 300–400° F. for a period of at least 36 hours or (b) the non-catalytic dry roasting of a hypochlorite oxidized starch at 300–400° F. for a period of 15 minutes to 6 hours.

2. Method as claimed in claim 1 wherein said heat modified starch material is present in said system in an amount of from about 0.002% to 0.05% by weight.

3. Method as claimed in claim 2 wherein said heat modified starch material is present in said system in an amount of from about .005% to about 0.01% by weight.

4. Method as claimed in claim 1 wherein said preoxidized starch material is heated at a temperature of about 400° F. for a period between about 1 and 3 hours.

5. Method as claimed in claim 4 wherein said temperature is between about 375 and 395° F.

6. Method as claimed in claim 1 wherein said heat modified starch material is heated at about 350° F. for about 168 hours.

7. Method as claimed in claim 1 wherein said inorganic alkaline reagent is present in the aqueous composition in an amount sufficient to provide a pH range of from about 7.5 to 10 thereto.

8. Method as claimed in claim 1 wherein said inorganic alkaline reagent is sodium hydroxide.

9. Method as claimed in claim 1 wherein said inorganic alkaline reagent is potassium hydroxide.

10. A calcium sulfate scale inhibiting composition consisting essentially of an alkaline aqueous solution of a non-catalytic heat modified starch material and an inorganic alkaline reagent consisting of a hydroxide of sodium, potassium or calcium, said aqueous solution containing sufficient inorganic alkaline reagent therein to dissolve said starch material in said solution and to provide a pH of from 7.1 to about 10 thereto, said non-catalytic heat modified starch material being prepared by the method consisting of (a) the non-catalytic dry roasting of starch at 300–400° F. for a period of at least 36 hours, or (b) the non-catalytic dry roasting of a hypochlorite oxidized starch at 300–400° F. for a period of 15 minutes to 6 hours, said heat modified starch material being present in the aqueous solution in a concentration between 0.002 and 0.05% by weight.

11. A scale inhibiting composition as claimed in claim 10 consisting essentially of about 80 to 85% by weight of a non-catalytic heat modified starch material and 20 to 15% by weight of sodium hydroxide.

12. A scale inhibiting composition as claimed in claim 10 consisting essentially of 70 to 75% by weight of a non-catalytic heat modified starch material and 30 to 25% by weight of slaked lime.

(References on following page)

References Cited

UNITED STATES PATENTS

| | | | |
|---|---|---|---|
| 1,873,083 | 8/1932 | Walker | 252—8.55 |
| 1,999,766 | 4/1935 | Lawton et al. | 252—8.55 |
| 2,411,074 | 11/1946 | Winkelmann | 252—180 |
| 2,505,457 | 4/1950 | Bird | 252—180 |
| 2,826,552 | 3/1958 | Bonewitz et al. | 252—180 |
| 2,831,022 | 4/1958 | Van Blaricom et al. | 252—8.5 |
| 3,232,871 | 2/1966 | Walker et al. | 252—8.5 |

FOREIGN PATENTS 480,734  1/1952  Canada.

LEON D. ROSDOL, *Primary Examiner.*

H. B. GUYNN, *Assistant Examiner.*